United States Patent

Seido et al.

(10) Patent No.: US 6,805,989 B2
(45) Date of Patent: Oct. 19, 2004

(54) SEPARATOR FOR SOLID POLYMER ELECTROLYTE FUEL CELL AND PROCESS FOR PRODUCING THE SAME

(75) Inventors: Masahiro Seido, Tokyo (JP); Tatsuya Tonogi, Tokyo (JP); Tsutomu Yamanaka, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 347 days.

(21) Appl. No.: 10/105,944

(22) Filed: Mar. 26, 2002

(65) Prior Publication Data

US 2002/0192527 A1 Dec. 19, 2002

(30) Foreign Application Priority Data

Mar. 26, 2001 (JP) ........................................ 2001-087834
Mar. 15, 2002 (JP) ........................................ 2002-071361

(51) Int. Cl.$^7$ .............................................. H01M 2/00
(52) U.S. Cl. ........................... 429/34; 429/38; 429/247; 427/122

(58) Field of Search ............................. 429/34, 38, 247; 427/122

(56) References Cited

FOREIGN PATENT DOCUMENTS

| JP | 2000-138067 | 5/2000 |
|----|-------------|--------|
| JP | 2000-353531 | 12/2000 |

*Primary Examiner*—Laura Weiner
(74) *Attorney, Agent, or Firm*—Foley & Lardner LLP

(57) ABSTRACT

The surface of highly conductive iron, copper, aluminum, magnesium, or alloy thereof is covered with highly corrosion-resistant titanium or titanium alloy through plastic working by rolling or extrusion to form a cladding material. At least one surface of the cladding material is covered with a carbon material to form a separator for a solid polymer electrolyte fuel cell. By virtue of the above constitution, the separator for a solid polymer electrolyte fuel cell has good workability and, at the same time, can surely maintain or improve electrical conductivity and corrosion resistance.

7 Claims, 8 Drawing Sheets

CABON-COVERED ROLLED CLADDING (Ti/Fe/Ti)

CABON-COVERED Fe

PURE ROLLED CLADDING (Ti/Fe/Ti)

CABON-COVERED WET PLATING (Sn/Fe/Sn)

CABON-COVERED VACUUM DEPOSITION PLATING (Ti/Fe/Ti)

SEPARATOR FOR SOLID POLYMER ELECTROLYTE FUEL CELL AND PROCESS FOR PRODUCING THE SAME

BACKGROUND OF THE INVENTION

1. Field of the Invention

The invention relates to a separator for a solid polymer electrolyte fuel cell using a solid polyelectrolyte and a process for producing the same. This type of separator is sometimes called a "bipolar plate" in the art. For convenience, the term "separator" will be used throughout the entire specification.

2. Prior Art

Conventional fuel cells using a solid polyelectrolyte have a construction, for example, as shown in FIG. 1A, i.e., a construction comprising; a solid polyelectrolyte film 50; and two electrode films (an anode-side electrode film 51 and a cathode-side electrode film 52) sandwiching the solid polyelectrolyte film 50 therebetween. In each of the electrode films, a catalyst layer, such as a platinum layer, is provided on and integrally with the solid polyelectrolyte film 50 side. Numeral 57 designates a sealing material for sealing the solid polyelectrolyte film 50 and the periphery of each of the anode-side electrode film 51 and the cathode-side electrode film 52 disposed respectively on both sides of the solid polyelectrolyte film 50. Numeral 54 designates an anode-side separator which is abutted against the anode-side electrode film 51. Grooves 53 for anode gas, such as hydrogen gas, are provided between the anode-side separator 54 and the anode-side electrode film 51. Numeral 56 designates a cathode-side separator which is abutted against the cathode-side electrode film 52. Grooves 55 for cathode gas, such as oxygen gas, are provided between the cathode-side separator 56 and the cathode-side electrode film 52. Both the separators 54, 56 should be formed of a material which is impermeable to gas and is electrically conductive. In general, the separators are fabricated of a carbon plate.

The mechanism of a reaction in the above fuel battery cell 58 will be explained. In the anode-side electrode film 51, hydrogen gas, which has been externally supplied through the grooves 53 for anode gas, is passed through a gas diffusion layer within the electrode film 51, reaches near a reaction zone, and is absorbed into the catalyst to form active hydrogen atoms. As shown in the following formula, the hydrogen atoms are reacted with hydroxyl ions in the electrolyte to give water. In this case, two electrons are passed through the electrode film 51 and are transmitted to the other electrode side through an external circuit.

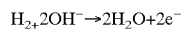

$$H_2 + 2OH^- \rightarrow 2H_2O + 2e^-$$

On the other hand, in the presence of the catalyst, the cathode-side electrode film 52 receives two electrons from the electrode film 51 side, and oxygen molecules, which have been externally supplied through the grooves 55 for cathode gas, are reacted with water from the electrolyte to produce hydroxyl ions.

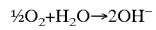

$$\tfrac{1}{2}O_2 + H_2O \rightarrow 2OH^-$$

The hydroxyl ions produced in the cathode-side electrode film 52 move through the electrolyte and reach the anode-side electrode film 51, and an electrical circuit is formed as a whole.

Therefore, the reaction in the whole fuel cell is as follows.

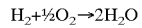

$$H_2 + \tfrac{1}{2}O_2 \rightarrow 2H_2O$$

That is, in the reaction, hydrogen in the fuel gas is reacted with oxygen in the air to produce water.

In actual fuel cells, a fuel cell stack 60 having a laminate structure as shown in FIG. 2 is adopted. The fuel cell stack 60 has a structure comprising: a laminate of a large number of fuel battery cells in a plate form as shown in FIG. 1A; and pipings for supplying fuel gas (hydrogen gas and oxygen gas) to the laminate. Regarding the pipings, in FIG. 2, numeral 61 designates an anode gas introduction pipe, numeral 62 an anode gas discharge pipe, numeral 63 a cathode gas introduction pipe, and numeral 64 a cathode gas discharge pipe.

In the fuel cell stack 60, the separators used generally have a structure suitable for lamination, as shown in FIG. 1, wherein an anode-side separator 54 and a cathode-side separator 56 have been integrally provided respectively on the front and back sides. A specific structure thereof is as shown in FIGS. 3 and 4. FIG. 4 is a cross-sectional view taken on line A—A of FIG. 3, FIG. 3A a left side view of FIG. 4, and FIG. 3B a right side view of FIG. 4.

Regarding this separator, in FIG. 1, the grooves 53 for anode gas in the anode-side separator 54 and the grooves 55 for cathode gas in the cathode-side separator 56 are grooves which each extend in a direction perpendicular to the paper surface and are parallel to one another. In FIGS. 3 and 4, the grooves 53 for anode gas are grooves extending in the vertical direction of the paper surface of FIG. 3A, while the grooves 55 for cathode gas are grooves extending in the left and right direction of the paper surface of FIG. 3B. The grooves 53 for anode gas cross the grooves 55 for cathode gas in the front-and-back-side relationship.

Regarding this separator, as shown in FIGS. 3 and 4, in the anode-side separator 54, both ends of the grooves 53 for anode gas are respectively in communication with an introduction passage hole 65 connected to the anode gas introduction pipe 61 and a discharge passage hole 66 connected to the anode gas discharge pipe 62. On the other hand, in the cathode-side separator 56, both ends of the grooves 55 for cathode gas are respectively in communication with an introduction passage hole 67 connected to the cathode gas introduction pipe 63 and a discharge passage hole 68 connected to the cathode discharge pipe 64.

The separators 54, 56 having the above structure are generally prepared by forming grooves in a carbon plate. Therefore, for strength reasons, there is a restriction on an increase in opening area of the grooves 53 for anode gas and the grooves 55 for cathode gas. This poses a problem that the pressure loss is large in each gas passage and the supply efficiency of the fuel gas is lowered by a level corresponding to the pressure loss.

Further, in general, the carbon plate has excellent electrical conductivity and contact resistance. The carbon plate, however, is mechanically brittle. This poses a problem that, in forming the grooves, the width of peaks provided between grooves should be made wide to some extent for avoiding a lack of mechanical strength.

Further, since the peak portions are used in the state of being strongly pushed against the electrode films, in this pushed portion, the fuel gas (hydrogen gas) cannot be supplied to the electrode film side. This lowers the supply efficiency of the fuel gas and thus disadvantageously deteriorates power generation efficiency by a level corresponding to the supply efficiency lowering level.

Furthermore, in this type of fuel cell, the use of pure oxygen as an oxidizing agent is not cost effective, and there is a demand for the use of air per se. Since, however, the concentration of oxygen in the air is as low as about 20%, when the discharge of the air is not successfully carried out, the oxygen concentration on the cathode-side electrode film 52 side is relatively lowered in relationship with the fuel gas (hydrogen gas), disadvantageously leading to deteriorated power generation efficiency.

Further, on the cathode-side electrode film 52 side, protons are reacted with oxygen to give water, and, consequently, there is a fear of this water clogging the gas passage.

When all the above facts are taken into consideration, the fuel battery cell should inevitably has a very complicate structure.

On the other hand, a proposal has been made on a technique wherein a material is used which has been produced by providing a metal, which can realize complicate working with high accuracy, as the material for the separator and covering the surface of the metal with a metal nitride as a protective layer (Japanese Patent Laid-Open No. 353531/2000 entitled "SEPARATOR FOR SOLID POLYMER ELECTROLYTE FUEL CELL AND PROCESS FOR PRODUCING THE SAME").

This technique is advantageous in that, when the metal is used as a separator, a thin separator can be fabricated with high accuracy. Since, however, the protective film is a metal nitride, the electrical conductivity and the anticorrosive property are not fully satisfactory. Further, a burden is disadvantageously imposed on the formation of the protective layer.

Further, a proposal has been made on a technique wherein a material is used which has a structure produced by providing an electrically conductive and corrosion-resistant stainless steel plate as a metallic separator, subjecting this stainless steel plate to forming, providing a tin plating as a first coating on the formed product, for improving antioxidation properties and electrical conductivity of the stainless steel plate, and covering the tin coating with graphite as a second coating, for maintaining the corrosion resistance (Japanese Patent Laid-Open No. 138067/2000 entitled "GAS SEPARATOR FOR FUEL CELL, FUEL CELL USING SAID GAS SEPARATOR FOR FUEL CELL, AND PROCESS FOR PRODUCING SAID GAS SEPARATOR FOR FUEL CELL").

In this technique, the tin plating as the first coating functions as an antioxidation film for a base metal, and the graphite as the second coating functions as a layer for inhibiting the corrosion of the antioxidation film (when the antioxiation film is a plating, the surface has a structure having micropores and thus is likely to be attacked) (anticorrosive function).

In this technique, an example is described wherein, beside tin plating, a nickel, titanium, or conductive ceramic coating is used as the first coating. When nickel or titanium is used, the specific resistance of the oxide thereof is very high and is close to that of the insulating material or semiconductor. Therefore, when oxidation proceed in a wide area, the electrical conductivity as the separator cannot be maintained (i.e., the surface resistivity is increased) even though the oxidation of the base metal can be prevented. In this connection, the following fact should be noted. The graphite as the second coating per se is electrically conductive, is chemically stable, and is anticorrosive and, in addition, poses no problem of ion elution, but on the other hand, is mechanically brittle, is likely to cause cracks or pinholes with the elapse of time. For this reason, it is difficult to say that the graphite has excellent anticorrosion effect. Due to this nature, during use for a long period of time, although the graphite per se is not deteriorated, the first coating is corroded. This corrosion functions as an origin of corrosion, and the base metal also is attacked and the corrosion region is widened. As a result, ions of the constituent metal is eluted. This poses a problem that the catalyst and the electrolyte are deteriorated and the characteristics as the fuel cell is disadvantageously deteriorated. Further, in this connection, it should be noted that, since the tin plating as the first coating has a structure such that micropores are present on its surface, the corrosion resistance is unsatisfactory and this is also considered causative of the widening of the corrosion region.

Here the resistance of C (sintered graphite) is $10^{+3}$ $\mu\Omega.cm^2$, whereas the resistance of tin oxide, nickel oxide, and titanium oxide is $10^{+4}$ $\mu\Omega.cm^2$ for $SnO_2$, $10^{+6}$ $\mu\Omega.cm^2$ for NiO, and $10^{+7}$ $\mu\Omega.cm^2$ for $TiO_2$. That is, as compared with tin, the resistance of nickel oxide and titanium oxide is incomparably larger than that of tin. Incidentally, the resistance of the metals is 12.8 $\mu\Omega.cm^2$ for tin and 55 $\mu\Omega.cm^2$ for titanium.

The surface resistivity refers to resistance as measured by a method wherein both surfaces of a plate sample having a predetermined dimension is pressed by a press under a predetermined pressure and, in this state, the resistance between both the surfaces of the sample in the direction of thickness is measured as the surface resistivity. The surface resistivity somewhat varies depending upon the pressure applied by the press, the thickness of the sample, and the area of the plate sample. When these values are substantially equal for each sample, the surface resistivity value varies according to the state of oxide formed on the surface of titanium or titanium alloy. The pressure is applied by the press for making the contact between the surface of the electrode plate and the surface of the plate sample satisfactory over the whole surface. When the pressure applied by the press is proper, there would be little or no influence of the thickness of the plate samples and the difference in area between samples on the surface resistivity.

SUMMARY OF THE INVENTION

Accordingly, it is an object of the invention to solve the above problems of the prior art and to provide a separator for a solid polymer electrolyte fuel cell which has good workability and, at the same time, can surely maintain or improve electrical conductivity and corrosion resistance and to provide a process for producing the same.

According to the first feature of the invention, a separator for a solid polymer electrolyte fuel cell, comprises: a cladding material formed by covering the surface of highly conductive copper, aluminum, magnesium, iron, or alloy thereof with highly anticorrosive titanium or titanium alloy through plastic working by rolling or extrusion; and a carbon material covering at least one surface of the cladding material.

In the separator according to the first feature of the invention, the surface of the titanium or titanium alloy in the cladding material has an oxide film having a thickness in the order of nm and the cladding material has a surface resistivity of not more than 5 $m\Omega.cm^2$.

In the separator according to the first feature of the invention, 5 to 20% of the whole thickness of the cladding material is accounted for by the covering of the titanium or titanium alloy in the cladding material and the thickness of the cladding material is 0.1 to 2 mm.

In the separator according to the first feature of the invention, 5 to 20% of the whole thickness of the cladding material is accounted for by the covering of the titanium or titanium alloy in the cladding material and the thickness of the cladding material is 0.1 to 0.5 mm.

According to the second feature of the invention, a process for producing a separator for a solid polymer electrolyte fuel cell comprises the steps of: covering the surface of highly conductive copper, aluminum, magnesium, iron, or alloy thereof with highly anticorrosive titanium or a titanium alloy by plastic working to form a cladding material, wherein, after the covering of the surface of the highly conductive copper, aluminum, magnesium, iron, or alloy thereof with copper, the plastic working is carried out and the copper present on the surface of the cladding material is then removed; and then covering at least one surface of the cladding material with a carbon material.

According to the first and second features of the invention, the use of a cladding material formed by covering the surface of inexpensive and highly iron, conductive copper, aluminum, magnesium, or alloy thereof with highly corrosion-resistant titanium or titanium alloy through plastic working by rolling or extrusion permits a film of titanium or a titanium alloy, which per se has excellent corrosion resistance, to be formed as a dense film which has no micropores on its surface and has better corrosion resistance. Further, the covering of the surface of the film with a carbon material can significantly inhibit the oxidation of the titanium or titanium alloy underlying the carbon material, in addition to the anticorrosion effect of the material per se. As a result, the electrical conductivity and corrosion resistance as the separator for a fuel cell can be surely improved. According to the invention, by virtue of a combination of the effect attained by the cladding material of titanium or titanium alloy particularly produced by plastic working and the effect of the covering of the carbon material, a special effect can be attained such that the oxidation of the surface of titanium or titanium alloy can be significantly inhibited and, in particular, the oxide formation region can be limited to a local area.

Further, in the invention, for the covering of the titanium or the titanium alloy in the cladding material, the adoption of a specific construction, wherein the thickness of the oxide film on the surface of the cladding material is in the order of nm and the surface resistivity of the whole cladding material is not more than 5 mΩ·cm², permits the electrical conductivity as the separator for a fuel cell to be maintained in a suitable range for a long period of time. When the thickness of the oxide film is larger than the above thickness and the surface resistivity exceeds 5 mΩ·cm², satisfactory electrical conductivity as the separator cannot be ensured.

In the invention, the thickness of the titanium or titanium alloy covering is preferably 0.1 to 2 mm, more preferably 0.1 to 0.5 mm, from the viewpoint of ensuring corrosion resistance on a level which is high enough to withstand use for a long period of time. The proportion of the covering of titanium or titanium alloy is preferably 5 to 20% in terms of volume ratio based on the whole cladding material.

Further, in the production process of a separator for a fuel cell according to the invention, in performing plastic working of the cladding material, after the covering of the surface of the material with copper, the plastic working is performed followed by the removal of the copper from the surface of the material. By virtue of this construction, the cladding material composed of a material having poor formability can be very easily formed.

BRIEF DESCRIPTION OF THE DRAWINGS

The invention with be explained in more detail in conjunction with the appended drawings, wherein:

FIG. 3 is a side view of a separator shown in FIG. 4, wherein

DESCRIPTION OF THE PREFERRED EMBODIMENTS

Preferred embodiments of the invention will be explained in conjunction with the accompanying drawings.

Figure 5:
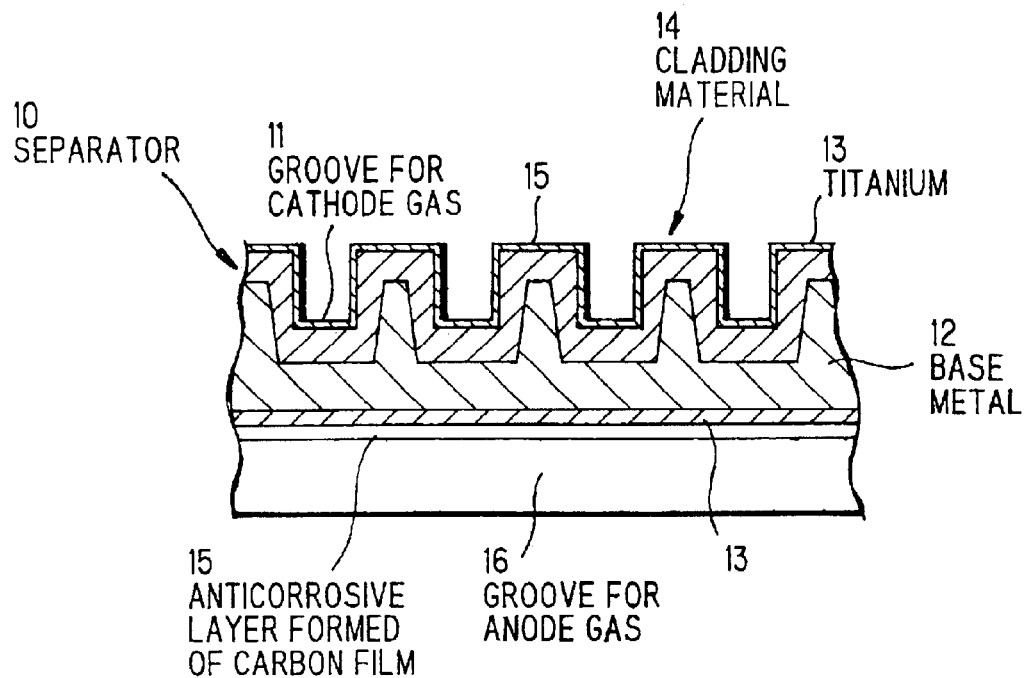
FIG. 5 is a cross-sectional view of a separator according to a first preferred embodiment of the invention.

FIG. 5 is a cross-sectional view showing the principal part of a separator for a solid polymer electrolyte fuel cell according to the invention.

Figure 3A:
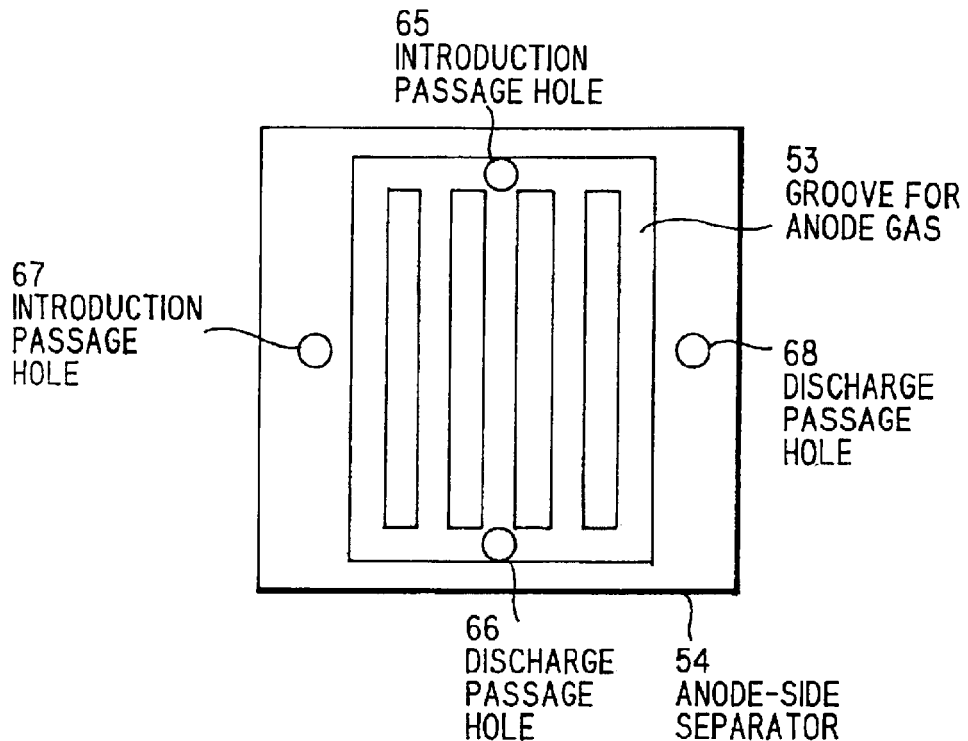
FIG. 3A is a left side view and FIG. 3B is a right side view.
Figure 3B:
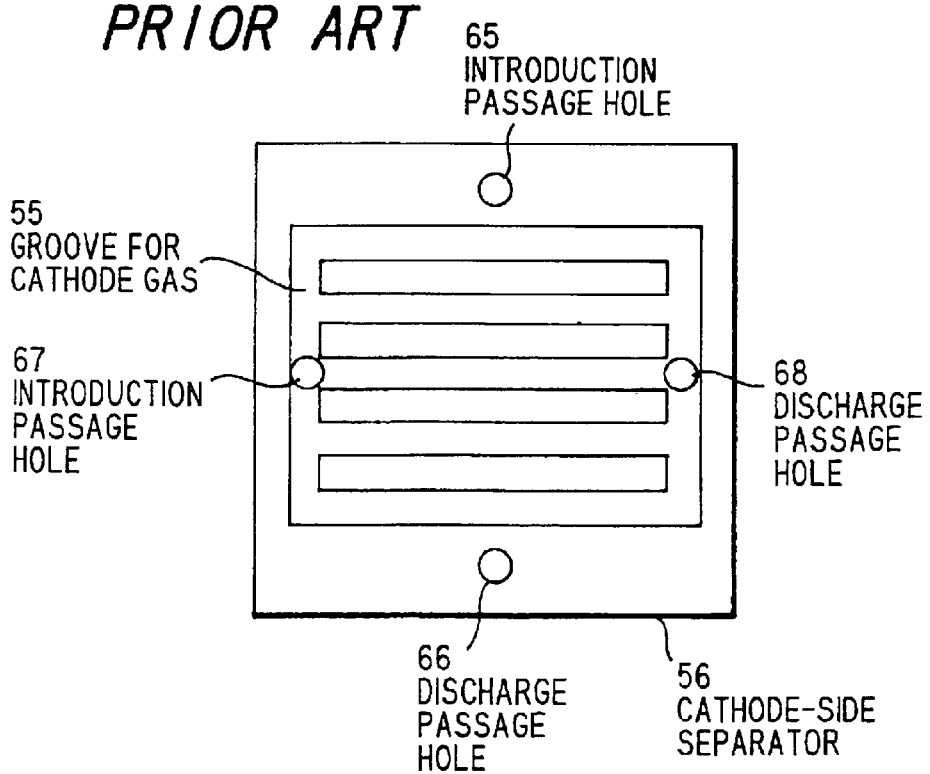
Figure 4:
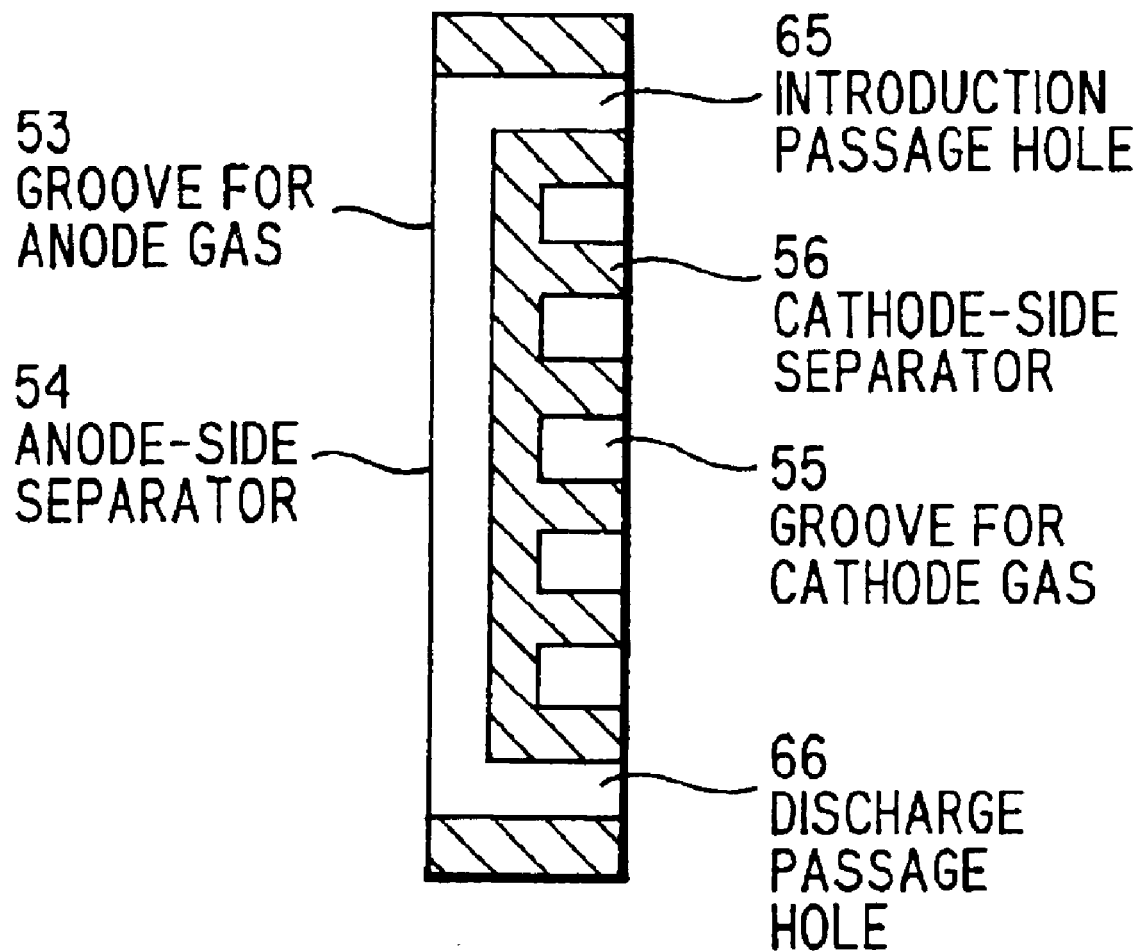
FIG. 4 is a cross-sectional view taken on line A—A of FIG. 3A.
Figure 8:
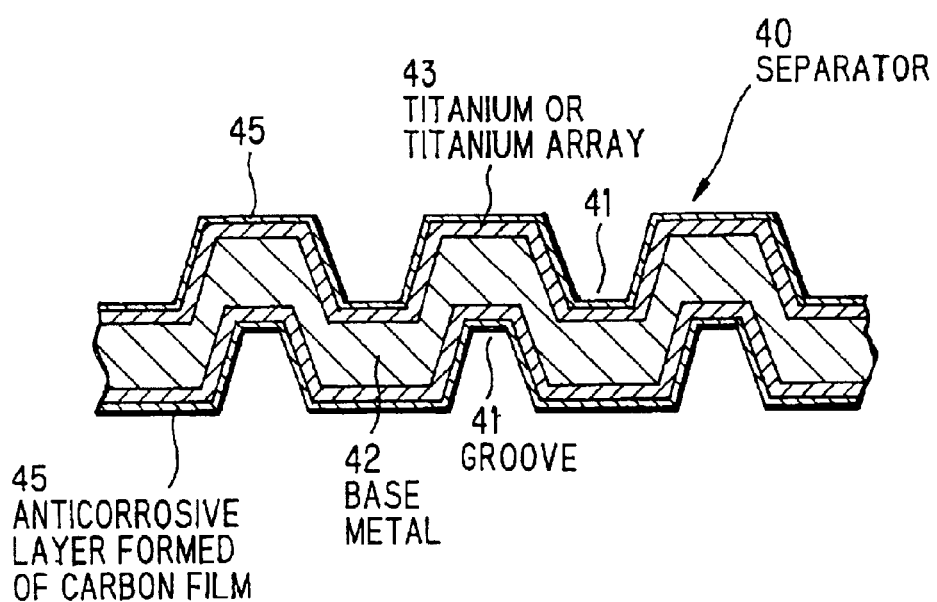
FIG. 8 is a cross-sectional view of a separator according to another preferred embodiment of the invention.

In the drawing, a separator 10 comprises: a cladding material 14 formed by covering both surfaces of a base metal 12 formed of an inexpensive and highly conductive copper alloy with titanium 13 through plastic working by extrusion or rolling; and an anticorrosive layer 15, formed of an about 5 μm-thick carbon film, provided on both surfaces of the cladding material 14. Numeral 11 designates grooves for cathode gas, and numeral 16 grooves for anode gas. Regarding the whole structure of the separator 10, as shown in FIGS. 3 and 4, an anode-side separator and a cathode-side separator are provided integrally with each other in a front-and-back-side relationship. The grooves for anode gas and the grooves for cathode gas cross each other in a front-and-back-side relationship. As shown in FIG. 8, instead of the above grooves grooves may be provided in such a manner that grooves 41 provided on the front side are parallel to grooves 41 on the back side. In FIG. 8, numeral 40 designates a separator, numeral 42 a base metal, numeral 43 titanium or titanium alloy, and numeral 45 an anticorrosive layer formed of a carbon film.

Here 20% by volume of the whole cladding material is accounted for by the titanium 13 covering. The anticorrosive layer 15 of a carbon film is formed by polishing the surface of titanium 13 and then coating carbon on the polished surface.

Figure 6:
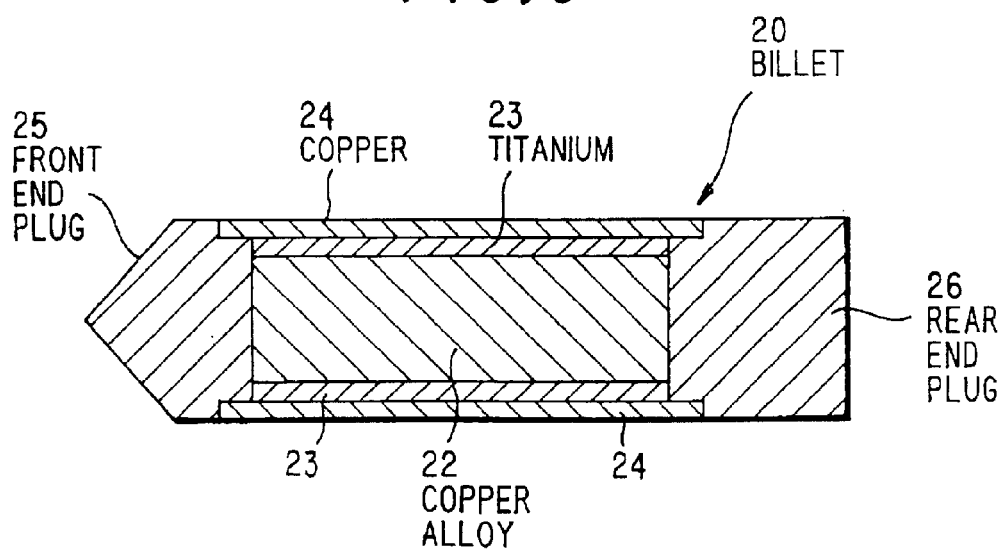
FIG. 6 is a cross-sectional view of a composite billet used in the production of a separator.

Here an extrusion method using a composite billet 20 as shown in FIG. 6 has been adopted in the production of the cladding material comprising titanium 13 covered on the surface of the base metal 12 formed of a copper alloy. In FIG. 6, numeral 22 designates a copper alloy as a base metal, numeral 23 titanium, and numeral 24 as a member surrounding the whole circumference of the extrusion material, numeral 25 a member for a front end plug as a member for smoothly conducting extrusion, and numeral 26 a rear end plug.

Figure 7:
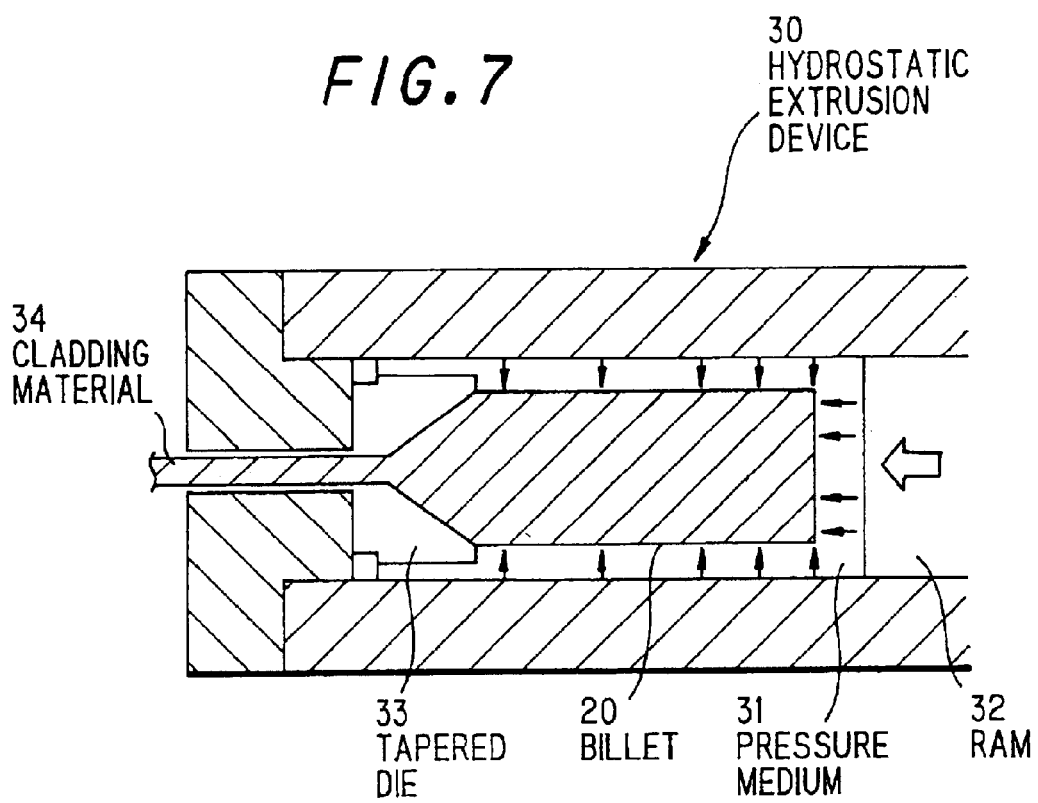
FIG. 7 is a cross-sectional view of a hydrostatic extrusion device for extruding a composite billet.

FIG. 7 shows a hydrostatic extrusion device 30 using the billet 20 as an extrusion material. A cladding material 34 of a rectangle in section was produced by this apparatus 30. Specifically, the billet 20 set in the device is extruded through a tapered die 33 by moving a ram 32 from behind the billet 20 in a direction indicated by an arrow to enhance the pressure of a pressurizing medium 31. The cladding material 34 was then rolled to prepare a tin cladding material of a rectangle in section having a thickness of 2 mm and a width of 100 mm. Further, this cladding material was pressed to form grooves (grooves 11 for cathode gas and grooves 16 for anode gas) as shown in FIG. 5. Thereafter, the copper 24 on the surface was chemically removed with nitric acid to prepare a separator 10 having predetermined geometry. The thickness of the covering of titanium 13 in the separator 10 is 0.2 mm. The interface of joint of the cladding material constituting the separator 10 is free from any oxide film by virtue of joining between clean surfaces of metals as the material, and, thus, it can be said that there is little or no increase in resistance based on the presence of joint interface.

Figure 1:
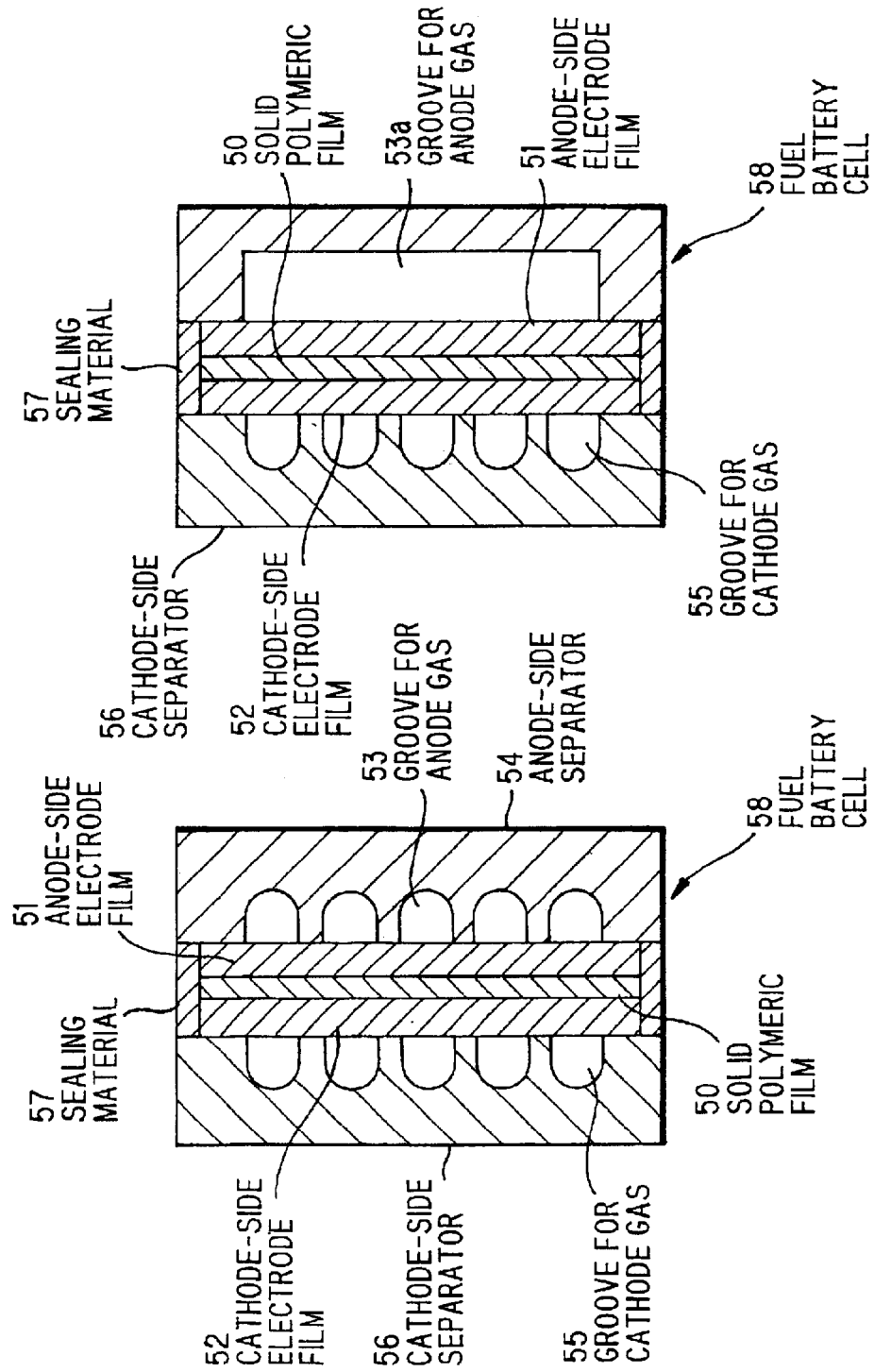
FIGS. 1A and 1B show a cross-sectional view of a fuel battery cell.
Figure 2:
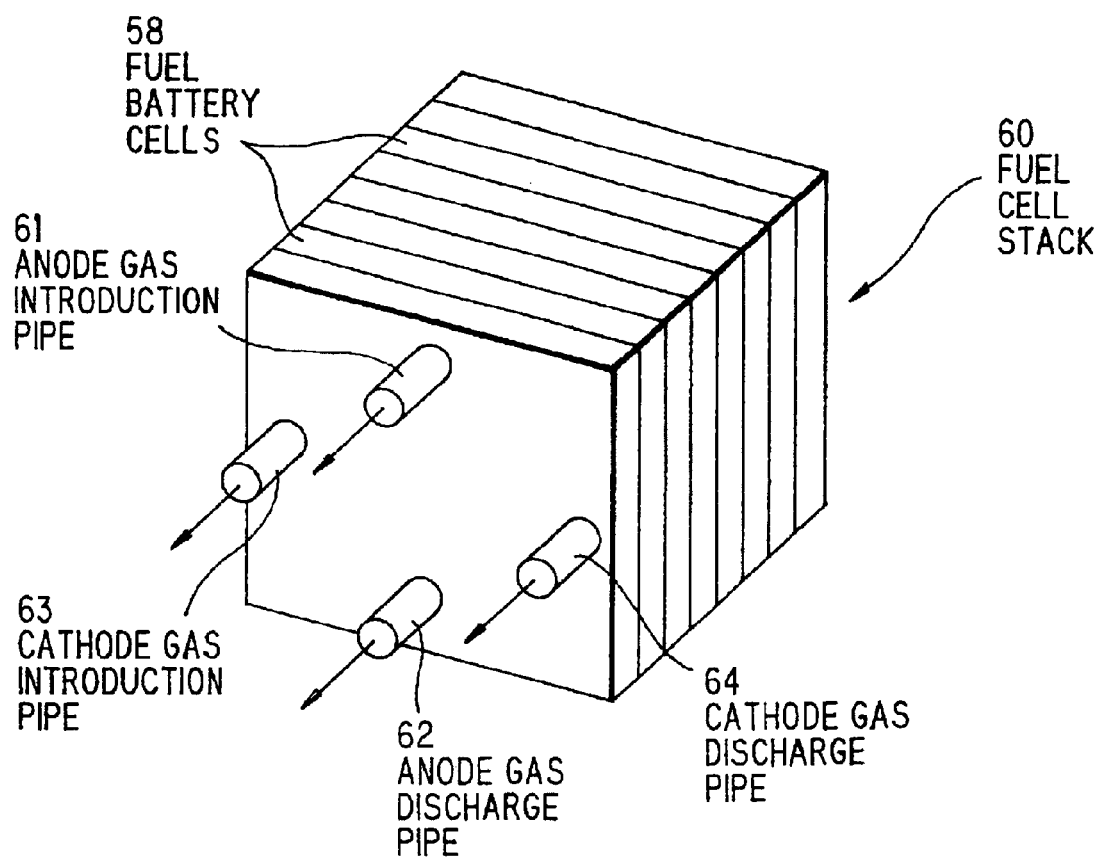
FIG. 2 is a perspective view of a fuel battery cell unit.

Ten separators 10 are stacked on top of one another, and a solid polyelectrolyte and carbon electrode films provided with a catalyst (an anode-side electrode film and a cathode-side electrode film) were incorporated to prepare a fuel cell stack as shown in FIG. 2. Incidentally, hydrogen gas and oxygen gas were supplied as fuels to the fuel cell stack, and the battery was operated. As a result, an electromotive force of 0.7×10=7 V was generated. Further, the operation of the battery for 200 hr and 1000 hr was carried out. As a result, there was no particular deterioration in electromotive force, and the electromotive force of 7 V was maintained.

Another preferred embodiment of the invention will be explained. (i) A cladding material formed by covering both sides of a base metal formed of iron with titanium by rolling (Ti/Fe/Ti), (ii) a composite material formed by plating both sides of a base metal formed of iron with tin by wet plating (Sn/Fe/Sn), and (iii) a composite material formed by plating both sides of a base metal formed of iron with titanium by vapor deposition plating, were prepared as the cladding material 14 having a structure shown in FIG. 5. A 20 $\mu$m-thick carbon film (an anticorrosive layer 15) was formed on both sides of these cladding materials and composite materials to form three separators having substantially identical geometry. For the composite material (iii), titanium vapor deposition plating was adopted because wet plating was substantially impossible. Pure iron was used as the iron. The thickness of the cladding material 14 and composite materials excluding the carbon film was as small as 0.3 mm. In the case of the material (i), the thickness of titanium formed on each side of the base metal was 30 $\mu$m. That is, 20% by volume of the whole cladding material was accounted for by the titanium covering. In the case of the material (ii), the thickness of tin plating formed on each side of the base metal was 10 $\mu$m, and, in the case of the material (iii), the thickness of titanium, which had been vapor deposited on each side of the base metal, was 5 $\mu$m. The carbon film was formed by coating an intimate mixture composed of conductive graphite, carbon black, and a binder resin onto the surface-cleaned cladding material and composite materials and then sintering the coating.

The three separators were tested for corrosion, and, for plate samples having an identical area, the surface resistivity was then measured with an identical surface resistivity measuring device at a pressing pressure of 8 kg/cm². As a result, the surface resistivity was 5 m$\Omega$·cm² for the material (i) (titanium cladding), 40 m$\Omega$·cm² for the material (ii) (tin plating), and 20 to 30 m$\Omega$·cm² for the material (iii) (titanium vapor deposition plating). Here the corrosion test refers to a PCT test wherein environmental conditions of 120° C. and 2 atm are held for 24 hr.

Figure 10:
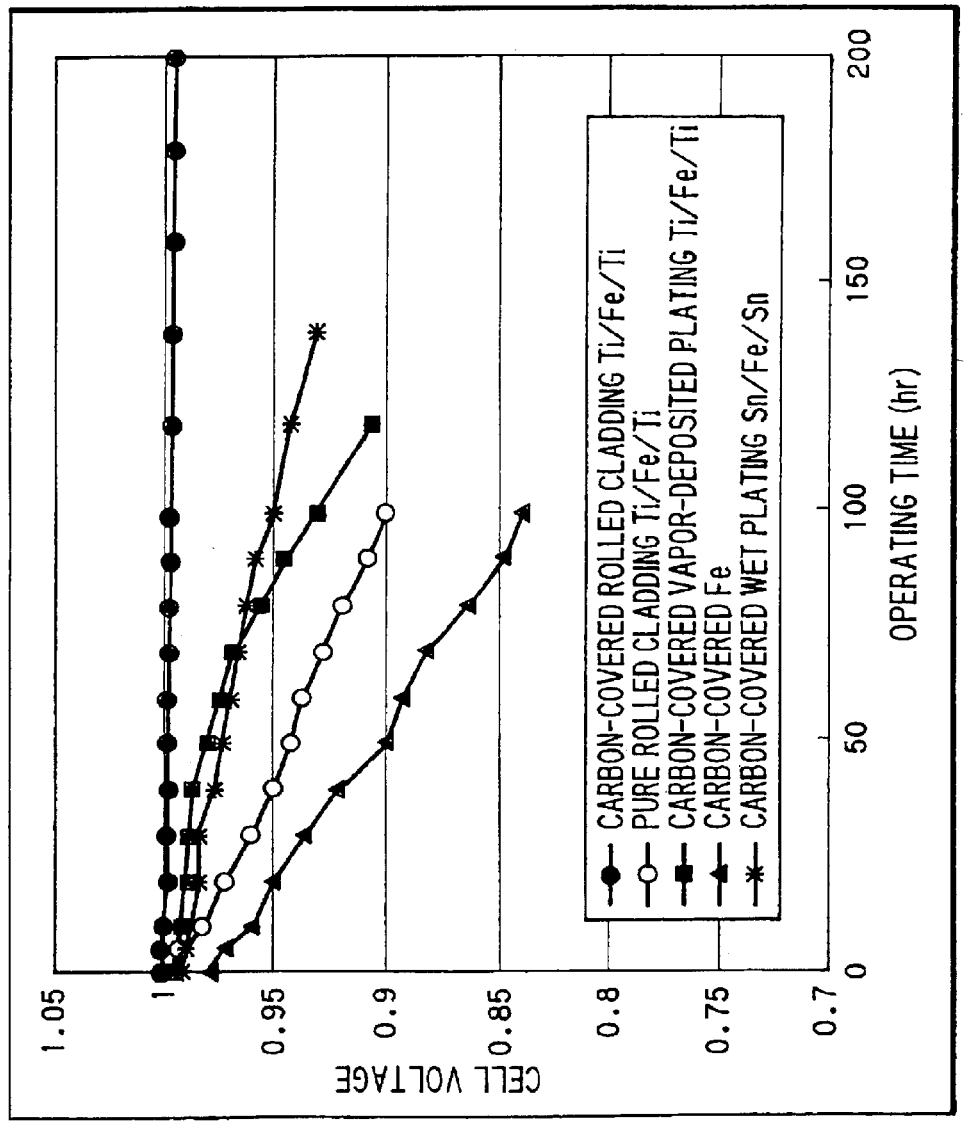
FIG. 10 is a diagram illustrating a relationship between operation time and generated voltage (cell voltage).

Next, the above three separators were used to prepare one-cell-type fuel cells. For these fuel cells, a change in generated voltage (cell voltage) over the operation time was measured to evaluate the characteristics. The results were as shown in FIG. 10. In FIG. 10, in addition to the results of measurement for fuel cells using the three separators, the results of measurement for a fuel cell using a separator formed of a carbon covering-free Ti/Fe/Ti cladding material and a fuel cell using a separator formed of carbon-covered iron are also shown for comparison. The cell voltage values were expressed in dimensionless number determined by comparison with a standard value, i.e., an initial value of the fuel cell using the separator formed of the material (i). i.e., a carbon-covered titanium cladding material.

On the other hand, simultaneously with the measurement of the cell voltage, for the above fuel cells, a change in resistance between the separators and ions eluted into the produced water caused by the cell reaction were detected. The results are shown in Table 1.

TABLE 1

Change in resistance at the time of power generation in metallic separators and ions detected in produced water

| Construction of metallic separator | Anticorrosive film formation method | Carbon film | Change in resistance at the time of power generation | Ions detected in produced water |
| --- | --- | --- | --- | --- |
| Ti/Fe/Ti | Rolled cladding | Formed | Not changed | None |
|  |  | Not formed | Significantly changed | None |
|  | Vapor deposition plating | Formed | Significantly changed | (Fe) |
| Fe | — | Formed | Significantly changed | Fe |
| Sn/Fe/Sn | Wet plating | Formed | Changed | Sn, (Fe) |

As is apparent from FIG. 10, for the fuel cell using the separator formed of a carbon-covered Ti/Fe/Ti cladding material corresponding to the material (i) as a preferred embodiment of the invention, the cell voltage was substantially constant, and, although a slight lowering in cell voltage was observed, the level in the deterioration of the cell voltage was in the order or about 20 mv/100 hr. This deterioration level corresponds to a deterioration of about 2 to 3% for 1000-hr operation. On the other hand, for the fuel cells using the comparative separators corresponding to the materials (ii), (iii), and the like, the cell voltage was significantly lowered.

As is apparent from Table 1, for the fuel cell using the separator formed of a carbon-covered Ti/Fe/Ti cladding material corresponding to the material (i) as the preferred embodiment of the invention, there was little or no change in resistance at the time of power generation, and metal ions were not detected in the produced water. On the other hand, for the fuel cells using the comparative separators corresponding to the materials (ii), (iii) and the like, the change in resistance was larger and, in addition, iron (Fe) and tin (Sn) ions were detected in the produced water.

This is considered attributable to a corrosion reaction or progress of corrosion of the surface of the separator. FIG. 9 shows models of the progress of corrosion of the respective five separators used in the experiment of which the results are shown in FIG. 10. In FIG. 9, numeral 31 designates a base metal formed of iron, numeral 32 a clad titanium covering formed by rolling or extrusion, numeral 33 a carbon film, numeral 34 cracks formed in the carbon film 33, numeral 35 an oxide layer formed directly on the surface of the clad titanium covering 32, or formed on the surface of each of the clad titanium covering 32, the vapor deposited titanium 37, and the tin plating 38 through the crack 34, and numeral 36 a corrosion region of the base metal spread mainly from the oxide layer 35 as an origin.

Figure 9A:
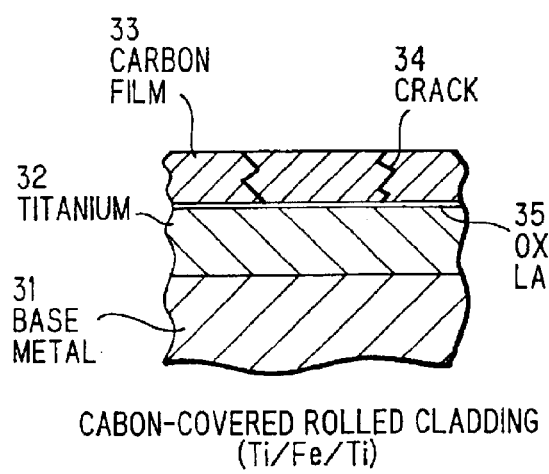
FIGS. 9A through 9E are diagrams illustrating the progress of corrosion of the surface of a separator.

In FIG. 9A, wherein a combination of the clad titanium covering 32 with the carbon film 33 is used as the separator, the oxide layer 35 formed on the surface of the titanium 32 through the crack 34 in the carbon film 33 has a very small area and is locally formed. Therefore, as is apparent from FIG. 10 and Table 1, over operation time, the cell voltage is substantially constant, there is little or no change in resistance, and elution of metal ions into the produced water does not also occur.

Figure 9D:
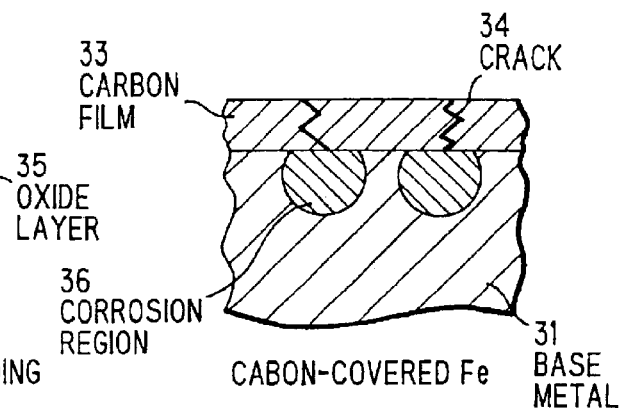
Figure 9B:
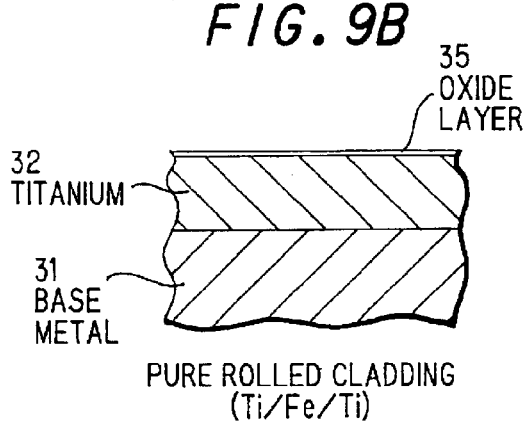

On the other hand, in the case of the separator not provided with a carbon film shown in FIG. 9B, the oxide layer 35 is formed on the whole surface of the titanium 32. For this reason, as is apparent from FIG. 10 and Table 1, as the operation time increases, the cell voltage decreases and, in addition, a large change in resistance occurs. The elution of metal ions into the produced water does not occur because of chemical stability of titanium oxide ($TiO_2$) constituting the oxide layer 35.

Figure 9E:
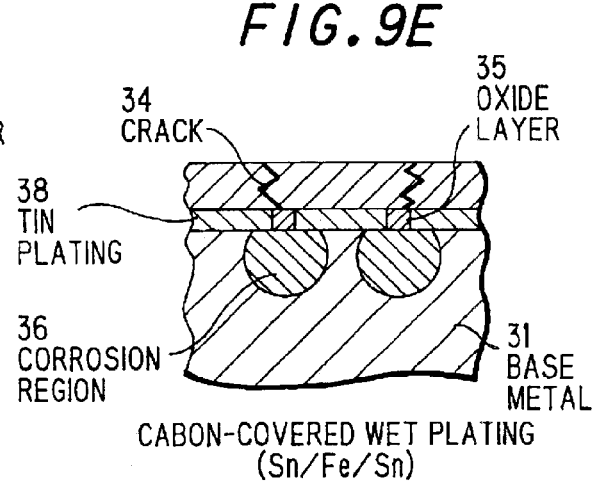
Figure 9C:
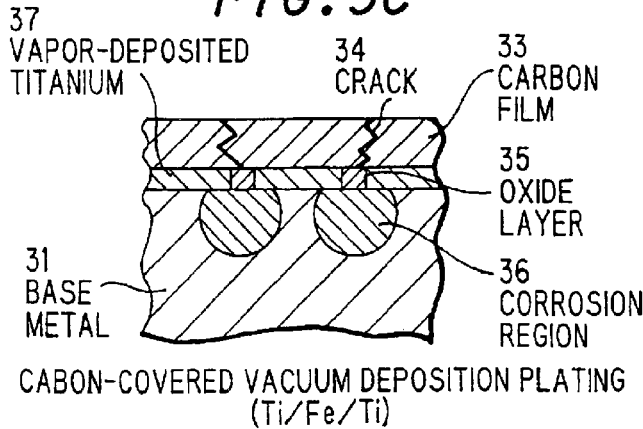

For all the separators shown in FIGS. 9C, 9D, and 9E, the corrosion deeply progresses to the base metal 31, and the corrosion region is spread from the oxide layer 35 as an origin.

In these drawings, the formation of the oxide layer 35 is considered attributable to the penetration of the fuel gas or the produced water into the cracks in the carbon film. The vapor deposited titanium 37 and the tin plating 38 are disadvantageous from the viewpoint of the prevention of corrosion of the base metal. As is apparent from Table 1, in these cases, metal ions were detected in the produced water.

In the above preferred embodiments, copper (copper alloy) or iron has been used as the base metal. Alternatively, aluminum, magnesium, or alloys of these metals may be used. It was confirmed that these materials can offer the same effect.

The separator according to the invention comprises: a cladding material formed by covering the surface of a highly conductive metal with titanium or a titanium alloy by plastic working; and a carbon material covering the surface of the cladding material. By virtue of this constitution, as compared with the use of a carbon plate as the separator, better workability can be realized, and the electrical conductivity and the corrosion resistance as the separator can be surely maintained or improved.

Further, the production process of a separator according to the invention can very easily produce the separator having the above effects.

The invention has been described in detail with particular reference to preferred embodiments, but it will be understood that variations and modifications can be effected within the scope of the invention as set forth in the appended claims.

What is claimed is:

1. A separator for a solid polymer electrolyte fuel cell, comprising: a cladding material formed by covering the surface of highly conductive copper, aluminum, magnesium, iron, or alloy thereof with highly corrosion-resistant titanium or titanium alloy through plastic working by rolling or extrusion; and a carbon material covering at least one surface of the cladding material.

2. The separator for a solid polymer electrolyte fuel cell according to claim 1, wherein the surface of the titanium or titanium alloy in the cladding material has an oxide film having a thickness in the order of nm and the cladding material has a surface resistivity of not more than 5 m$\Omega$.cm$^2$.

3. The seperator for a solid polymer electrolyte fuel cell according to claim 2, wherein 5 to 20% of the whole thickness of the cladding material is accounted for by the covering of the titanium or titanium alloy in the cladding material and the thickness of the cladding material is 0.1 to 2 mm.

4. The separator for a solid polymer electrolyte fuel cell according to claim 2, wherein 5 to 20% of the whole thickness of the cladding material is accounted for by the covering of the titanium or titanium alloy in the cladding material and the thickness of the cladding material is 0.1 to 0.5 mm.

5. The separator for a solid polymer electrolyte fuel cell according to claim 1, wherein 5 to 20% of the whole thickness of the cladding material is accounted for by the covering of the titanium or titanium alloy in the cladding material and the thickness of the cladding material is 0.1 to 2 mm.

6. The separator for a solid polymer electrolyte fuel cell according to claim 1, wherein 5 to 20% of the whole thickness of the cladding material is accounted for by the covering of the titanium or titanium alloy in the cladding material and the thickness of the cladding material is 0.1 to 0.5 mm.

7. A process for producing a separator for a solid polymer electrolyte fuel cell, comprising the steps of: covering the surface of highly conductive copper, aluminum, magnesium, iron, or alloy thereof with highly corrosion-resistant titanium or a titanium alloy by plastic working to form a cladding material, wherein, after the covering of the surface of the highly conductive copper, aluminum, magnesium, iron, or alloy thereof with copper, the plastic working is carried out and the copper present on the surface of the cladding material is then removed; and then covering at least one surface of the cladding material with a carbon material.

* * * * *